Aug. 2, 1949. J. J. KUEHN 2,477,624
REMOVABLE FILM GATE ASSEMBLY FOR
PICTURE PROJECTION APPARATUS
Filed June 14, 1946 3 Sheets-Sheet 1

INVENTOR.
JOHN J. KUEHN.
BY
Joseph B. Lindecker
ATT'Y.

Aug. 2, 1949.  J. J. KUEHN  2,477,624
REMOVABLE FILM GATE ASSEMBLY FOR
PICTURE PROJECTION APPARATUS
Filed June 14, 1946  3 Sheets-Sheet 2

INVENTOR.
JOHN J. KUEHN.
BY
Joseph B. Lindecker
ATT'Y.

Aug. 2, 1949.     J. J. KUEHN     2,477,624
REMOVABLE FILM GATE ASSEMBLY FOR
PICTURE PROJECTION APPARATUS
Filed June 14, 1946     3 Sheets-Sheet 3
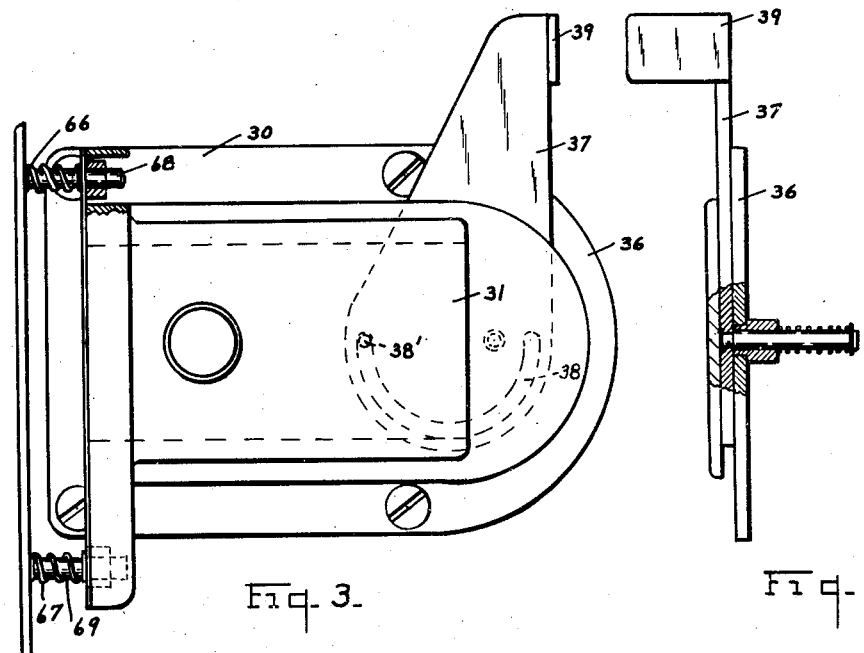
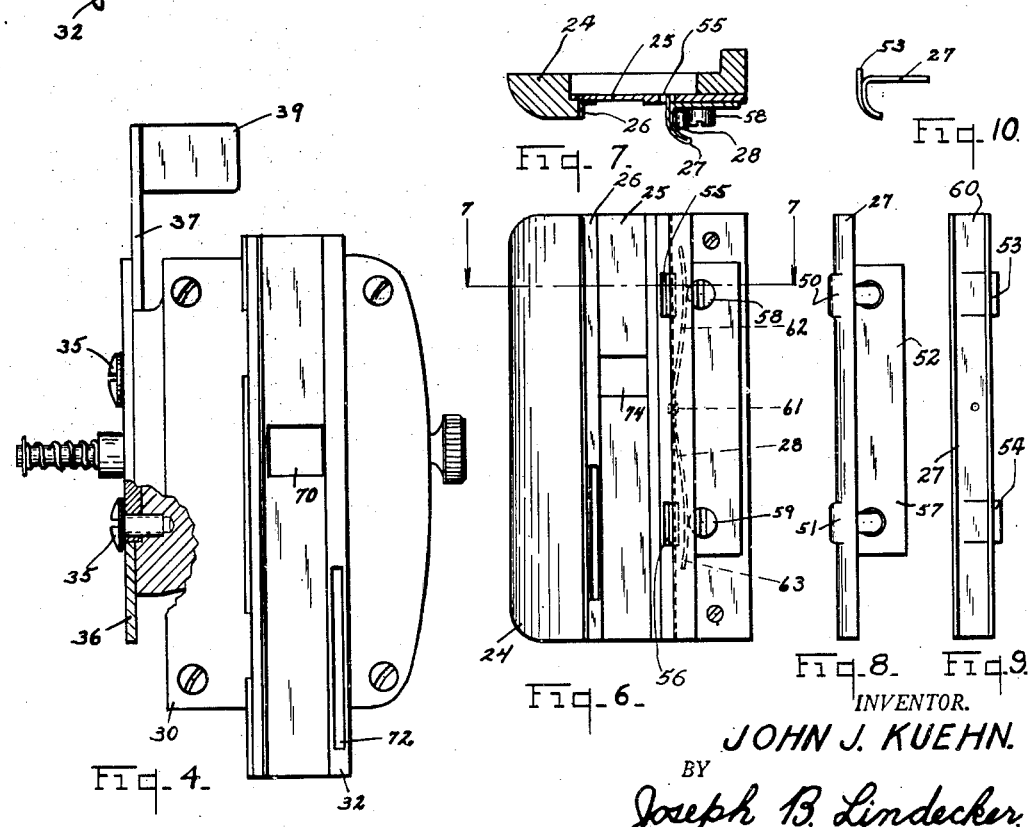
INVENTOR.
JOHN J. KUEHN.
BY
Joseph B. Lindecker
ATT'Y.

Patented Aug. 2, 1949

2,477,624

UNITED STATES PATENT OFFICE 2,477,624

REMOVABLE FILM GATE ASSEMBLY FOR PICTURE PROJECTION APPARATUS

John J. Kuehn, Chicago, Ill., assignor, by mesne assignments, to Illinois Watch Case Co., Elgin, Ill., a corporation of Illinois Application June 14, 1946, Serial No. 676,679

5 Claims. (Cl. 88—17)

This invention relates to a film guiding assembly for a film handling apparatus combined with a complete removable lens mount and more particularly to the gate construction and accessories thereto for use with motion picture machines, although not limited to this use alone.

One of the objects of this invention resides in the provision of improved means for mounting the complete lens mount assembly in position on the part by which it is supported, and so arranged as to provide for quick and easy removal of the lens mount assembly from its supporting means when desired.

Another object of this invention is to provide a new and improved form and arrangement of parts comprising the film gate assembly and a removable lens mount of a projector whereby the gate pressure plate is normally pressed lightly toward a film channel plate mounted on a film channel bracket for holding the film slidably in position therebetween, and whereby the gate pressure plate and the removable lens mount may be moved readily away from the film channel plate so as to permit the film to be easily threaded into position and whereby the lens mount may be completely removed for cleaning said film, film gateway, pressure plate and lens.

A further object of this invention is the provision of a film guiding assembly containing a film channelway for guiding a film strip in a plane, a stationary edge guiding means at one side of the channelway and a one piece spring actuated pressure plate mounted on the opposite side of said channel for urging the film towards said stationary edge guiding means.

With these objects in view, my invention consists in certain features of novelty in the constructions, combination and arrangement of parts by which the said objects and certain other objects, hereinafter appearing, are effected, all as fully described with reference to the accompanying drawings and more particularly pointed out in the appended claims.

Figure 3 is a side view of the film gate assembly, the lens removed.

Figure 4 is a forward end view of the film gate assembly shown in Figure 3, parts in section.

Figure 5 is a rear end view of assembly, shown in Figure 3, parts removed.

Figure 6 is a front view of the film channelway assembly showing the novel one piece pressure plate associated with co-operative parts.

Figure 7 is a sectional view taken substantially on the line 7—7 of Figure 6, looking in the direction of the arrows.

Figure 8 is a side view of the side pressure plate as found in the channel assembly.

Figure 9 is a rear view of the side pressure plate shown in Figure 8.

Figure 10 is a top view of the side pressure plate shown in Figures 8 and 9.

Figure 1:
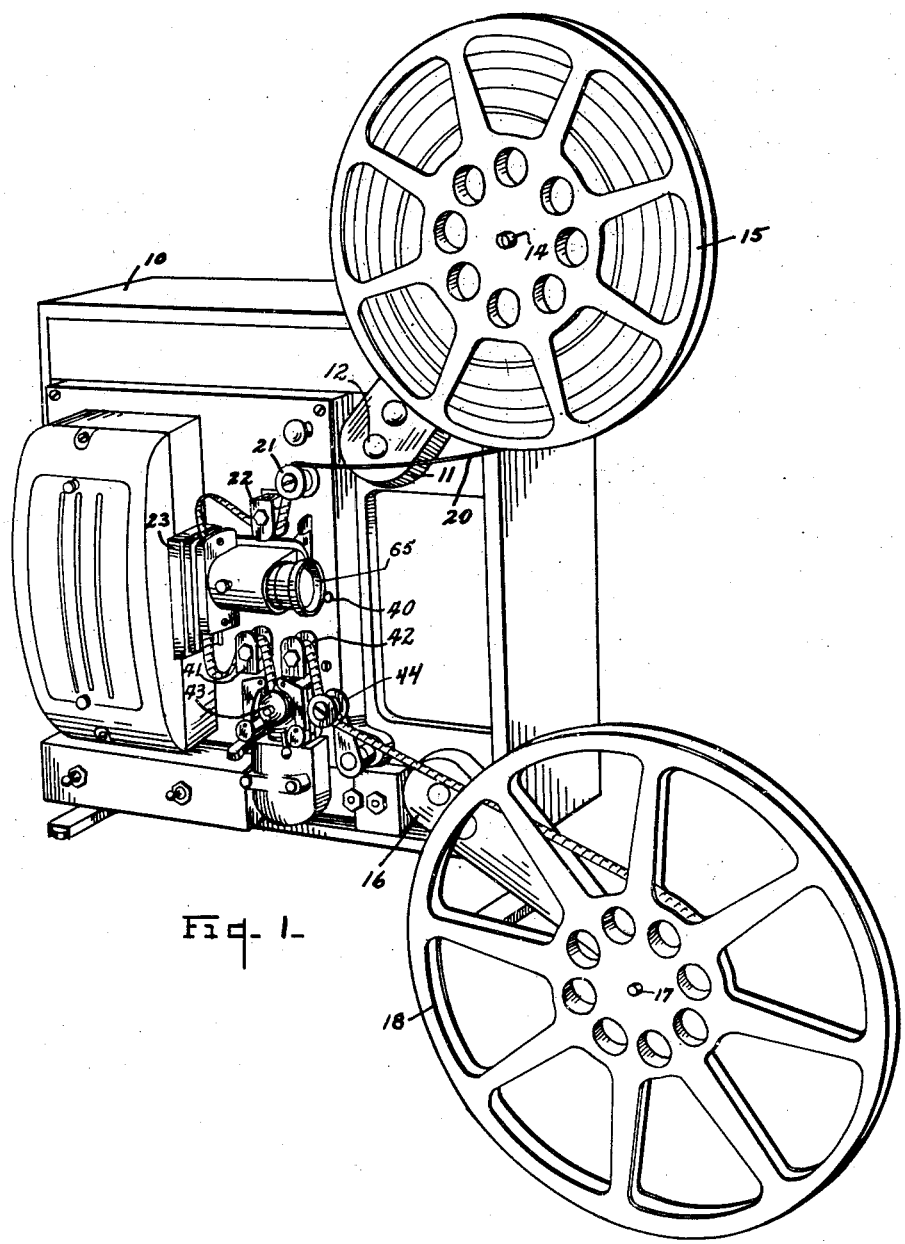
Figure 1 is a perspective view of a motion picture projector embodying the present invention.

Before explaining in detail the present invention, it is to be understood that the invention is not limited in its application to the details of construction and arrangement of parts illustrated in the accompanying drawings, since the invention is capable of other embodiments and being practiced or carried out in various ways. Also, it is to be understood that the phraseology or terminology employed herein is for the purpose of description and not of limitation.

Referring to the drawings, it will be observed that the invention is illustrated as being embodied in a motion picture projector having a main housing 10, from which various parts extend outwardly, an arm 11 being pivoted at 12, this arm 11 carrying a shaft 14 on which a reel 15 for carrying film may be mounted. On the lower part of the housing 10 there is an arm 16 which supports a shaft 17 which may carry a reel 18. Normally, the reel 15 and the shaft 14 are called a supply reel and shaft and the reel 18 and the shaft 17 are called a take-up reel and shaft. In the normal operation of the machine, film 20 is drawn from reel 15 and is passed over a roller 21 and about a sprocket 22 with film engaging parts, said sprocket 22 and parts have been fully disclosed in patent application of John Eugene Huber, Serial No. 615,563, filed September 11, 1945, now Patent 2,438,286. From this sprocket the film is looped through the film channelway designated broadly as 23 and consisting of a film channel bracket 24, film channel plate 25, film channel guide 26, side pressure plate 27, side pressure spring 28. Said channelway 23 is associated with the film gate assembly designated broadly as 30, as shown in Figure 4, and consisting of a lens mount casting 31, which has spring mounted thereon, a gate pressure plate 32, said plate being supported by the gate pressure studs 68 and 69 with a gate pressure spring 66 and 67 associated therewith. The film gate assembly of parts 30 are secured together by the necessary screws and other means common in the art, so will not be described herein. The rear side of said assembly 30 has four large headed screws designated as 35, these screw heads are so arranged that they act as alignment members when said gate assembly, or complete lens mount assembly is placed upon the gate frame member 36, said heads 35 fitting snugly into milled slots designated 34, said frame member 36 being secured to the projector body 10 by four binding head screws so that the plate extends away from the body a distance slightly greater than the thickness of said heads 35. When the assembly 30 is once mounted upon gate frame 36, it is held in place by a gate lever 37 pivotally mounted upon said frame 36, said lever being of desired configuration and comprising a semi-circular groove 38. Juxtaposed the screw heads 35 on rear face of assembly 30 is secured a pin 39′, said pin constructed to fit into and travel in groove 38 when said assembly 30 is moved laterally. The free end of lever 37 is bent at right angles to form a handle 39, as is clearly shown in the drawings. A spring mounted gate stop pin 40 is mounted in the projector body 10 juxtaposed the end portion of gate frame 36, said pin 40 preventing the gate lever being moved from its normally vertical position downwardly past a horizontal position. Should it be desired to remove the lens mount assembly 30 laterally, said pin 40 is pressed into projector body 10 to allow gate lever 37 to be moved downwardly past a horizontal plane and in this lowermost position, the assembly 30 can be very easily and quickly removed therefrom; and further, when it is desired, said assembly can be very easily and quickly inserted into position upon the gate frame and locked thereon by moving said lever 37 upwardly above the horizontal plane or above said pin 40. When said lever 37 is moved from a horizontal position upwardly to a vertical position, the complete assembly 30 is moved to the left (Fig. 1) whereby the pressure plate 32 is pressed into contact with channel plate 25. As the film is drawn through this gate channelway 23 by suitable means which may be of any well known variety and which intermittently engages the film to move it intermittently through said channel and past the gate, it is fed to a second sprocket 41 and third sprocket 42, similar to sprocket 22 and mounted upon projector body. These sprockets 41 and 42 are geared to guide the film around the sound drum and through the stabilizer assembly designated broadly here as 43, said film thereafter leaving the sprocket 42 to travel over roller 44 to the take-up reel 18.

Since the invention relates particularly to the complete removable lens mount in combination with a one piece side pressure plate to provide the required snubbing action and gate tension and which simultaneously guides the film laterally to prevent weave or side unsteadiness, the power driving means such as motors, pulleys, gears and belts will not be described herein.

The film channelway assembly 23 as shown in Figures 6 and 7 comprises the film engaging track and exposure aperture along with a novel one piece side pressure plate 27. Said plate is formed with two bosses 50 and 51, the purpose of said bosses is to provide means for rubbing against the edge of the film, or form the desired means to guide the film against the opposite side wall of the channelway. The bosses 50 and 51 are stamped from the single piece of metal 52 and also form extending guide members 53 and 54 which extend into openings 55 and 56 formed in channel plate 25. The side wall 57 of said guide is loosely mounted upon the channel bracket by two large headed screws 58 and 59. Said side pressure spring 28 is mounted within the channel portion 60 of said plate 27 and held therein by being riveted thereto by rivet 61, located at the mid section of said spring. The end portions 62 and 63 of said spring 28 are so arranged as to contact the heads of screws 58 and 59. This type spring construction permits either end of pressure plate 27 to be pressed forwardly or rearwardly, or the entire plate 27 to be moved in either direction as the film is passing through the film channelway.

The film gate assembly as shown in Figures 3 and 4 and referred to above has the lens mount casting 31 for holding the usual lens 65 at one end thereof as shown in Figure 1. The spring mounted pressure plate 32 is mounted upon said casting at the end opposite to that holding the lens and held away from the casting by means of gate pressure springs 66 and 67 mounted upon gate pressure studs 68 and 69, thereby urging the plate 32 into the position shown in Figure 3. The movable plate 32, or gate member, has exposure aperture 70 as shown in Figure 3. The edge portion of said plate 32 has an elongated slot 72 to permit the prongs of the film feeding device to extend therethrough.

Figure 2:
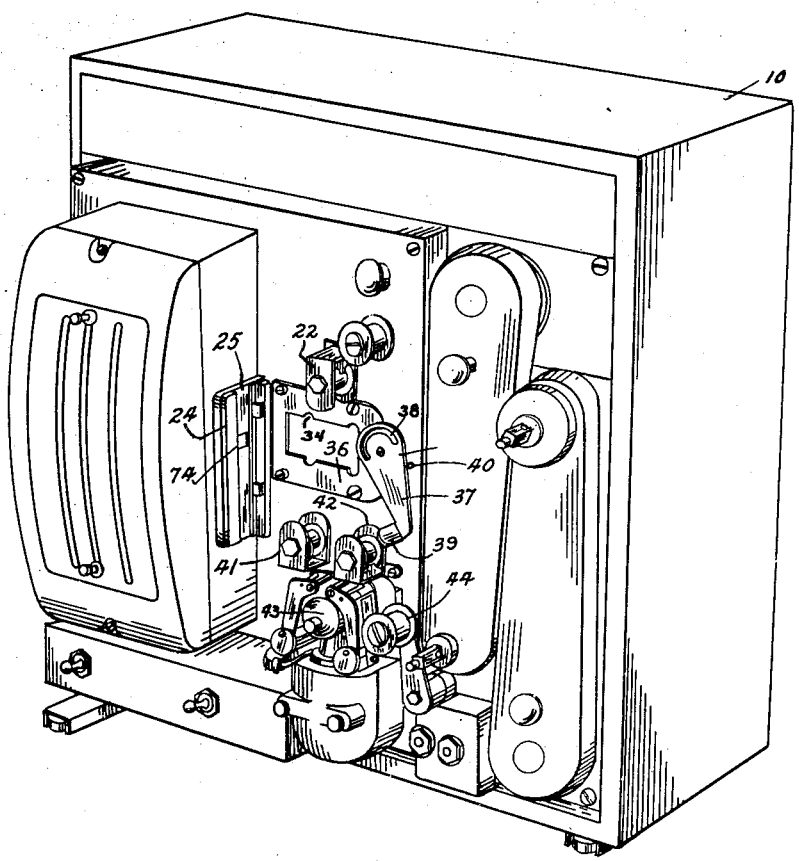
Figure 2 is a perspective view similar to Figure 1, with parts removed.

The exposure aperture 74 in film engaging track 75 of channelway assembly 23 is clearly shown in Figure 2.

A double contact means 50, 51 is provided upon the one piece side pressure plate of the guideway, and prevents too great amount of friction upon the edge of the film. This type of guideway thus far described is satisfactory for use with a film handling apparatus or slide projection equipment. Unsteadiness and weaving of the film or slide is overcome by this type of channelway and spring mounted gate combined with a movable lens mount; said lens mount constructed and arranged for quick removal and replacement thereof. Irregularities in film width will be compensated by said one piece spring pressure plate and irregularities in film thickness such as caused by the presence of a patch will be compensated by the gate pressure plate.

Since the present invention is susceptible of many variations, the present disclosure is to be considered as illustrative, the scope of the invention being defined by the appended claims.

Having now particularly described this invention, what I desire to secure by Letters Patent of the United States and what I claim is:

1. In a film projector having a film guideway with a fixed film channel plate having an opening for the passage of a beam of light therethrough, the combination with a casing, a lens mount supporting plate secured to said casing, a removable lens mount housing movable between operating and threading position and supported by said lens mount plate, a gate pressure plate resiliently mounted upon said lens mount housing and relative to said channel plate to normally press lightly toward said channel plate, manual operating means mounted upon said lens mount supporting plate for moving said lens mount between operating and threading position, a pin fixed to the rear surface of said lens mount housing and arranged to extend towards said casing, the free end of said pin arranged to extend into a curved groove formed in said operating means pivoted at one end thereof, and said means causing said lens mount to move laterally when said operating means is moved about its pivot, said film guideway having a stationary film guide member and a movable pressure guide member, a pair of projections formed upon said movable guide member, and a spring mounted between said movable guide member and said casing for urging said movable guide member toward said stationary guide member for engaging said pair of projections with one edge of a film strip to move the other side thereof against said stationary guide member.

2. In a commercial picture projector having in combination, a casing, a film guideway secured to said casing, a plate secured to said casing, a quick removable lens mount assembly slidably mounted upon said casing in front of an apertured film channel plate in said guideway, said lens mount assembly movable between operating and threading position with relation to said film plate, a manually operable lever comprising means to actuate the lens mount between operating and threading position and cooperating means on said lever and casing to lock the lens mount upon said plate.

3. In a film projector having a film guideway with a fixed film channel plate having an opening for the passage of a beam of light therethrough, the combination with a casing, a lens mount supporting plate secured to said casing, a removable lens mount housing movable between operating and threading position and supported by said lens mount plate, a gate pressure plate resiliently mounted upon said lens mount housing and relative to said channel plate to normally press lightly toward said channel plate, manual operating means mounted upon said lens mount supporting plate for moving said lens mount between operating and threading position, a pin fixed to the rear surface of said lens mount housing and arranged to extend towards said casing, the free end of said pin arranged to extend into a curved groove formed in said operating means pivoted at one end thereof, and said means causing said lens mount to move laterally when said operating means is moved about its pivot.

4. In a film projector having a film guideway with a fixed film channel plate having an opening for the passage of a beam of light therethrough, the combination with a casing, a lens mount supporting plate secured to said casing, a removable lens mount housing movable between operating and threading position and supported by said lens mount plate, a gate pressure plate resiliently mounted upon said lens mount housing and relative to said channel plate to normally press lightly toward said channel plate, manual operating means mounted upon said lens mount supporting plate for moving said lens mount between operating and threading position, a groove in said means, and a member on the lens mount housing adapted to extend into said groove to provide a stop for said lens mount, said member being movable out of said groove to permit ready removal of said lens mount.

5. In a film projector having a film guideway with a fixed film channel plate having an opening for the passage of a beam of light therethrough, the combination with a casing, a lens mount supporting plate secured to said casing, a removable lens mount housing movable between operating and threading position and supported by said lens mount plate, a gate pressure plate resiliently mounted upon said lens mount housing and relative to said channel plate to normally press lightly toward said channel plate, manual operating means mounted upon said lens mount supporting plate for moving said lens mount between operating and threading position, cooperating members on said supporting plate and lens mount permitting the moving of said mount between said positions, said members interengaging with each other to lock the mount on the plate, at least one of said members being movable to permit removal of said mount.

JOHN J. KUEHN.

REFERENCES CITED

The following references are of record in the file of this patent:

UNITED STATES PATENTS

| Number | Name | Date |
|---|---|---|
| 1,624,730 | Howell | Apr. 12, 1927 |
| 1,780,945 | Sapier | Nov. 11, 1930 |
| 1,855,775 | Shapiro | Apr. 26, 1932 |
| 1,884,609 | Dina | Oct. 25, 1932 |
| 2,366,084 | Briskin | Dec. 26, 1944 |

FOREIGN PATENTS

| Number | Country | Date |
|---|---|---|
| 691,854 | France | July 22, 1930 |